United States Patent
Liang et al.

(10) Patent No.: US 10,066,155 B1
(45) Date of Patent: Sep. 4, 2018

(54) VISCOSIFYING PROPPANTS FOR USE IN CARBON DIOXIDE-BASED FRACTURING FLUIDS AND METHODS OF MAKING AND USE THEREOF

(71) Applicant: Saudi Arabian Oil Company, Dhahran (SA)

(72) Inventors: Feng Liang, Cypress, TX (US); Ghaithan A. Al-Muntasheri, Katy, TX (US); Leiming Li, Sugar Land, TX (US); B. Raghava Reddy, Pearland, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/702,315

(22) Filed: Sep. 12, 2017

Related U.S. Application Data

(60) Provisional application No. 62/458,135, filed on Feb. 13, 2017.

(51) Int. Cl.
  *C09K 8/80* (2006.01)
  *E21B 43/267* (2006.01)
(52) U.S. Cl.
  CPC ............ *C09K 8/805* (2013.01); *E21B 43/267* (2013.01)
(58) Field of Classification Search
  CPC ........... C09K 8/80; C09K 8/805; E21B 43/26; E21B 43/267
  See application file for complete search history.

(56) References Cited

U.S. PATENT DOCUMENTS

| | | | | |
|---|---|---|---|---|
| 4,964,467 A | * | 10/1990 | Holtmyer | ............... C09K 8/685 166/268 |
| 6,686,438 B1 | | 2/2004 | Beckman et al. | |

(Continued)

FOREIGN PATENT DOCUMENTS

| | | |
|---|---|---|
| EP | 3124741 A1 | 2/2017 |
| WO | 2009/088315 A1 | 7/2009 |

(Continued)

OTHER PUBLICATIONS

Enrick et al., Mobility and Conformance Control for Co2 EOR via Thickeners, Foams, and Gels—A Literature Review of 40 Years and Pilot Tests, Eighteenth SPE Improved Oil Recovery Symposium, 2012, Society of Petroleum Engineers, Tulsa, Oklahoma.

(Continued)

*Primary Examiner* — Zakiya W Bates
*Assistant Examiner* — Crystal J Miller
(74) *Attorney, Agent, or Firm* — Dinsmore & Shohl

(57) ABSTRACT

Viscosifying proppants including proppant particles coated with a $CO_2$-philic coating in which the $CO_2$-philic coating has a solvable portion that viscosifies a $CO_2$-based fluid when the viscosifying proppant is added to the $CO_2$-based fluid are provided. Methods of making viscosifying proppants are also provided that include coating proppant particles with a precursor material of a $CO_2$-philic material, and polymerizing the precursor material to form a viscosifying proppant. Viscous hydraulic fracturing fluids include a $CO_2$-based fluid and the viscosifying proppants and methods of treating subterranean formations that include contacting a subterranean formation with a viscous hydraulic fracturing fluid and propagating at least one subterranean fracture are also provided.

16 Claims, 3 Drawing Sheets

(56) References Cited

U.S. PATENT DOCUMENTS

| | | | |
|---|---|---|---|
| 6,747,179 | B1 | 6/2004 | DeSimone et al. |
| 9,127,195 | B1 | 9/2015 | Ferrell, Jr. et al. |
| 2004/0040708 | A1 | 3/2004 | Stephenson et al. |
| 2005/0244641 | A1 | 11/2005 | Vincent |
| 2006/0258798 | A1 | 11/2006 | Richard et al. |
| 2007/0181302 | A1 | 8/2007 | Bicerano |
| 2010/0252259 | A1 | 10/2010 | Horton |
| 2010/0282462 | A1 | 11/2010 | Xu et al. |
| 2011/0036577 | A1 | 2/2011 | Bramatov et al. |
| 2012/0037371 | A1* | 2/2012 | Gupta ............... C09K 8/502 166/305.1 |
| 2012/0227967 | A1* | 9/2012 | Shaikh ............... C09K 8/805 166/280.1 |
| 2013/0233545 | A1 | 9/2013 | Mahoney et al. |
| 2014/0000890 | A1 | 1/2014 | Sun et al. |
| 2014/0014348 | A1 | 1/2014 | Mahoney et al. |
| 2014/0057813 | A1 | 2/2014 | Lanctot-Downs et al. |
| 2014/0060829 | A1 | 3/2014 | Nguyen |
| 2014/0060832 | A1 | 3/2014 | Mahoney et al. |
| 2014/0144631 | A1* | 5/2014 | Weaver ............... C09K 8/805 166/280.2 |
| 2015/0129213 | A1 | 5/2015 | Szabo et al. |
| 2016/0137908 | A1 | 5/2016 | Alwattari et al. |
| 2016/0333258 | A1 | 11/2016 | Drake et al. |
| 2017/0145301 | A1* | 5/2017 | Roper ............... C09K 8/805 |

FOREIGN PATENT DOCUMENTS

| | | | | |
|---|---|---|---|---|
| WO | WO-2009088315 | A1 * | 7/2009 | ............ C09K 8/685 |
| WO | 2013192438 | A2 | 12/2013 | |

OTHER PUBLICATIONS

Mahoney et al., Self-Suspending Proppant; SPE Hydraulic Fracturing Technology Conference; 2013, Society of Petroleum Engineers, The Woodlands, Texas.

O'Neill et al., Solubility of Homopolymers and Copolymers in Carbon Dioxide, Ind. Eng. Chem. Res. 1998, 3067-3079, vol. 37, American Chemical Society.

Gregg et al., Phase Behavior of Telechelic Polyisobutylene (PIB) in Subcritical and Supercritical Fluids. 2. PIB Size, Solvent Polarity, and Inter- and Intra-Association Effects for Blank, Monohydroxy, and Dihydroxy PIB (11K) in Ethane, Propane, Carbon Dioxide, and Dimethyl Ether; Macromolecules,1994, 4981-4985, vol. 27; American Chemical Society.

Johnston et al., Water-in-Carbon Dioxide Microemulsions: An Environment for Hydrophiles Including Proteins, 1996, 624-626m vol. 271, Science Magazine.

Harrison et al., Water-in-Carbon Dioxide Microemulsions with a Fluorocarbon-Hydrocarbon Hybrid Surfactant, Langmuir, 1994, 3536-3541, vol. 10, American Chemical Society.

Mertdogan et al., Solubility of Poly(tetrafluoroethylene-co-19 mol % hexafluoropropylene) in Supercritical Co2 and Halogenated Supercritical Solvents, Macromolecules, 1996, 6548-6555, vol. 29, American Chemical Society.

Rindfleisch et al., Solubility of Polymers and Copolymers in Supercritical CO2; Journal Physical Chemistry, 1996, 15581-15587, vol. 100, American Chemical Society.

Lepilleur et al., Effect of molecular architecture on the phase behavior of fluoroether-functional graft copolymers in supercritical CO2; Fluid Phase Equilibria, 1997, 285-305, vol. 134, Elsevier Science B.V.

Mesiano et al., The phase behavior of fluorinated diols, divinyl adipate and fluorinated polyester in supercritical carbon dioxide, Fluid Phase Equilibria, 2001, 169-177, vol. 178, Elsevier Science B.V.

McHugh et al., Solubility of CF2-Modified Polybutadiene and Polyisoprene in Supercritical Carbon Dioxide, Macromelecules, 2002, 4653-4657, vol. 35, American Chemical Society.

Hoefling et al., Effect of Structure on the Cloud-Point Curves of Silicone-Based Amphiphiles in Supercritical Carbon Dioxide, The Journal of Supercritical Fluids, 1993, 165-171, vol. 6, PRA Press.

Bayraktar et al., Miscibility, Phase Separation, and Volumetric Properties in Solutions of Poly(dimethylsiloxane) in Supercritical Carbon Dioxide, Journal of Applied Polymer Science, 2000, 1397-1403, vol. 75, John Wiley & Sons, Inc. 2000.

Kazarian et al., Specific Intermolecular Interaction of Carbon Dioxide with Polymers, Journal of American Chemical Society, 1996, 1729-1736, vol. 118; American Chemical Society.

Sarbu et al., Design and Synthesis of Low Cost, Sustainable Co2-philes, Ind. Eng. Chem, Res., 2000, 4678-4683, vol. 39, American Chemical Society.

Sarbu et al., Non-fluorous polymers with very high solubility in supercritical Co2 down to low pressures, MacMillan Magazines Ltd., 2000, 165-168, vol. 405, www.Nature.com.

Drohmann et al., Phase behavior of polymers containing ether groups in carbon dioxide; The Journal of Supercritical Fluids, 2002, 103-110, vol. 22; Elsevier Science.

Conway et al., Poly(lactide-co-glycolide) Solutions Behavior in Supercritical Co2, CHF3, and CHClF2; Journal of Applied Polymer Science, 2001, 1155-1161, vol. 80, John Wiley & Sons, Inc.

Fink et al., Toward the Development of "Co2-philic" Hydrocarbons. 1. Use of Side-Chain Functionalization to Lower the Miscibility Pressure of Polydimethylsiloxanes in Co2; Journal of Phys. Che., 1999, 6441-6444, vol. 3, American Chemical Society.

Shen et al., Co2-solubility of oligomers and polymers that contain the carbonyl group, Polymer, 2003, 1491-1498, vol. 44; Elsevier Science Ltd.

Raveendran et al., Cooperative C—H . . . O Hydrogen Bonding in CO2—Lewis Base Complexes: Implications for Solvation in Supercritical Co2, JACS Articles, 2002, 12590-12599, vol. 24, Journal American Chemistry Society.

Blatchford et al., Raman Spectroscopic Evidence for Cooperative C—H . . . O Interactions in the Acetaldehyde-CO2 Complex, JACS Communications, 2002,14818-14819, vol. 124, Journal American Chemistry Society.

Hu et al., Evaluation of Co2-Philicity of Poly(vinyl acetate) and Poly(vinyl acetate-alt-maleate) Copolymers through Molecular Modeling and Dissolution Behavior Measurement, The Journal of Physical Chemistry, 2015, 3194-3204, vol. 19, American Chemical Society.

Mahmood; Study of volume swelling and interfacial tension of the polystyrene-carbon dioxide-dimethyl ether system, Journal of Colloid and Interface Science, 2015, 174-181, vol. 456, Elsevier Inc.

Non-Final Office Action dated Mar. 21, 2018 pertaining to U.S. Appl. No. 15/889,924, filed Feb. 6, 2018, 7 pages.

Non-Final Office Action dated Mar. 21, 2018 pertaining to U.S. Appl. No. 15/889,916, filed Feb. 6, 2018, 9 pages.

Johnston, Keith P., Block copolymers as stabilizers in supercritical fluids, Colloid & Interface Science, Department of Chemical Engineering, University of Texas, pp. 351-356, USA, 2000.

International Search Report and Written Opinion dated Apr. 6, 2018 pertaining to International Application No. PCT/US2018/017734, filed Feb. 12, 2018, 6 pages.

International Search Report and Written Opinion dated Apr. 4, 2018 pertaining to International Application No. PCT/US2018/017223.

Kazarian, S.G.; Polymer Processing with Supercritical Fluids; Polymer Science, Ser. C; Jan. 1, 2000; pp. 78-101; vol. 42, No. 1.

Office Action dated May 4, 2018, pertaining to U.S. Appl. No. 15/702,310.

Office Action dated May 7, 2018, pertaining to U.S. Appl. No. 15/922,480.

Office Action dated May 18, 2018, pertaining to U.S. Appl. No. 15/922,489.

* cited by examiner

VISCOSIFYING PROPPANTS FOR USE IN CARBON DIOXIDE-BASED FRACTURING FLUIDS AND METHODS OF MAKING AND USE THEREOF

CROSS REFERENCE TO RELATED APPLICATIONS

This application claims the benefit of priority to U.S. Provisional Application Ser. No. 62/458,135, filed Feb. 13, 2017, which is incorporated by reference in its entirety.

BACKGROUND

Field

Embodiments of the present disclosure generally relate to viscosifying proppant systems. Specifically, embodiments of the present disclosure relate to viscosifying proppants and methods of making the same, methods of using viscosifying proppants to produce viscous carbon dioxide-based hydraulic fracturing fluids, and methods of using the resulted viscous hydraulic fracturing fluid to treat subterranean formations.

Technical Background

Carbon dioxide ($CO_2$) may be used in hydraulic fracturing fluids to provide non-aqueous alternatives to conventional water-based fluids, as some subterranean formations may be sensitive to water. Moreover, 'water-less' fluids are more environmentally sound, minimizing the depletion of natural-source freshwater often consumed in fracturing applications. However, conventional $CO_2$-based fluids are not sufficiently viscous to suspend propping agents, such as "proppants," that are added to fracturing fluids to hold open subterranean fractures during and following fracturing treatment. Because of this reduced ability to suspend proppants, $CO_2$-based fluids have not been widely considered for use in fracturing fluids.

Accordingly, a need exists for non-aqueous hydraulic fracturing fluids that adequately support and suspend proppant particles. Historically, it has been very difficult to thicken $CO_2$-based fluids using additives, as $CO_2$ is not a good solvent for high molecular-weight polymers. Though water-based fluids may be easily viscosified owing to the many available thickening agents that readily dissolve in water, $CO_2$-based fluids are not easily viscosified, owing to a lack of available materials that are $CO_2$-soluble.

SUMMARY

In embodiments of the present disclosure, viscosifying proppants including proppant particles coated with a $CO_2$-philic coating are provided. The $CO_2$-philic coating has a solvable portion that viscosifies a $CO_2$-based fluid when the viscosifying proppant is added to the $CO_2$-based fluid.

In further embodiments, methods of producing viscosifying proppants include coating a proppant particle with a polymerizable precursor material of a $CO_2$-philic composition to form a coated proppant, and polymerizing the precursor material to convert the coated proppant to a viscosifying proppant. The viscosifying proppant has a $CO_2$-philic coating with a solvable portion that viscosifies a $CO_2$-based fluid when the viscosifying proppant is added to a $CO_2$-based fluid.

In further embodiments of the present disclosure, methods for producing viscous hydraulic fracturing fluid include combining a $CO_2$-based hydraulic fluid with a first viscosity and combining the fluid with a viscosifying proppant. The viscosifying proppant has a $CO_2$-philic coating having a solvable portion that viscosifies the $CO_2$-based fluid when added to the $CO_2$-based fluid. Upon the addition of the viscosifying proppant, the $CO_2$-based hydraulic fluid increases in viscosity by at least 25% to form viscous hydraulic fracturing fluid.

In still further embodiments of the present disclosure, methods for treating subterranean formations include contacting a subterranean formation with a viscous hydraulic fracturing fluid comprising viscosifying proppant particles and propagating at least one subterranean fracture in the subterranean formation. The viscosifying proppant has a $CO_2$-philic coating having a solvable portion that viscosifies the $CO_2$-based fluid.

BRIEF DESCRIPTION OF THE DRAWINGS

The following detailed description of specific embodiments of the present disclosure can be best understood when read in conjunction with the following drawings, in which.

DETAILED DESCRIPTION

Figure 1:
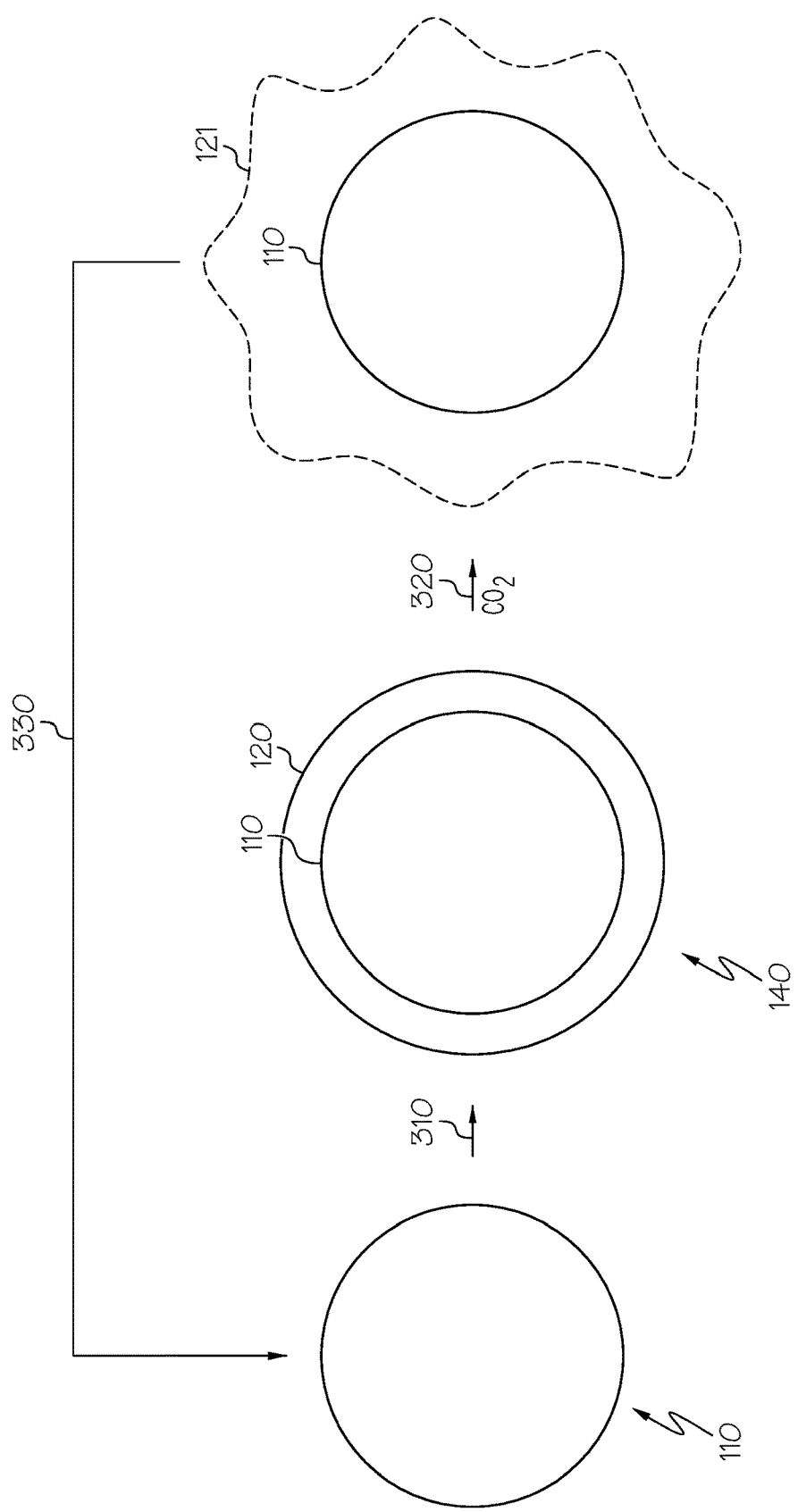
FIG. 1 is a schematic view of an uncoated proppant and a viscosifying proppant, according to embodiments shown and described.

Embodiments of the present disclosure include viscosifying proppants that include at least one proppant particle coated with a $CO_2$-philic coating. Further embodiments include methods of making viscosifying proppants and methods of making viscous hydraulic fracturing fluids using viscosifying proppants. Still further embodiments include methods of using viscous hydraulic fracturing fluid to treat a subterranean formation. The fluids may be used in methods for treating subterranean formations to overcome the problems associated with waterless fracturing fluids, such as inadequate viscosity, for example.

Subterranean formations such as rock, coal, or shale are treated by pumping a hydraulic fracturing fluid containing proppants into an opening in the formation to aid propagation of a fracture. The pressure of the injecting fluid causes the formation to fracture, and while the fluid is allowed to flow back to the surface, the proppants remain in the fracture and prevent the formation from closing or collapsing. Conventionally, $CO_2$-based fracturing fluids have such a low viscosity that proppant particles added to the fluid immediately sink and are not pumped into the fracture until the last of the fluid has been used. As a result, the fracture may close prematurely.

Embodiments of the present disclosure address these difficulties by providing viscosifying proppant particles for use in $CO_2$-based fluids, as well as simplified, economical methods for treating subterranean formations with viscous hydraulic fracturing fluids made by adding viscosifying proppants to $CO_2$-based fluid. The viscosifying proppants are coated with a $CO_2$-philic material having at least a portion of the coating that dissolves in $CO_2$. When the viscosifying proppant is added to a $CO_2$-based fluid, this solvable portion viscosifies the $CO_2$-based fluid such that the thickened fluid can support the now uncoated proppant particles. As used throughout the disclosure, "$CO_2$-philic" refers to a molecule, ion, polymer, or composition having an affinity or attraction to $CO_2$. The term "$CO_2$-based fluid" refers to a fluid that includes $CO_2$.

Specific embodiments will be described with references to the figures. Whenever possible, the same reference numerals will be used throughout the drawings to refer to the same or like parts. As used throughout this disclosure, the singular forms "a," "an" and "the" include plural referents unless the context clearly dictates otherwise. Thus, for example, reference to "a" component includes aspects having two or more such components, unless the context clearly indicates otherwise.

FIG. 1 illustrates the various stages of making and using a viscosifying proppant 140 through a schematic depiction. As represented by FIG. 1, an uncoated proppant particle 110 may undergo a coating step 310 such that a $CO_2$-philic coating 120 overlies the proppant particle 110 to form a viscosifying proppant 140. As the viscosifying proppant 140 further undergoes a contacting step 320 and is exposed to $CO_2$, at least a portion of the $CO_2$-philic coating 120 may begin to dissolve. The dissolving $CO_2$-philic coating 121 is depicted by dashed lines in FIG. 1. Upon exposure to $CO_2$, the solvable portion of the dissolving $CO_2$-based coating 121, which in FIG. 1 is the entire coating, begins to dissolve into the $CO_2$-based fluid. The dissolving $CO_2$-philic coating 121 may completely dissolve, leaving an again uncoated proppant particle 110, as shown by arrow 330. As at least a portion of the $CO_2$-philic coating 120 dissolves into the $CO_2$-based fluid, the dissolving $CO_2$-philic coating 121 may viscosify the hydraulic fluid such that the now uncoated or partially coated proppant particles 110 may suspend in the fluid.

Many suitable proppant particles 110 may be used to form the viscosifying proppant 140. The proppant particle 110 may be chosen from any type of proppant suitable for use in hydraulic fracturing applications. As previously described, proppants are "propping agent" particles used in hydraulic fracturing fluids to maintain and hold open subterranean fractures during or following subterranean treatment. In some embodiments, the proppant particle 110 may comprise materials such as oxides, silicates, sand, ceramic, resin, plastic, mineral, glass, or combinations thereof. For instance, the proppant particle 110 may comprise graded sand, treated sand, resin-coated sand, ceramic proppants, plastic proppants, low-density proppants, or other resin-coated materials. The proppant particle 110 may comprise particles of bauxite or of sintered bauxite. The proppant particle 110 may comprise glass particles or glass beads. Embodiments of the present disclosure may utilize at least one proppant particle 110 and in embodiments in which more than one proppant particle 110 is used, the proppant particles 110 may contain a mixture of two or more different materials, such as three or more different materials.

The material of the proppant particle 110 may be chosen based on the particular application and characteristics desired in a viscosifying proppant 140. For instance, ceramic proppant materials may be suitable in embodiments desiring high strength, uniform size and shape, high thermal resistance and high conductivity. Fully or partially cured resin-coated sand may be chosen in embodiments to provide particles of irregular size and shape with medium crush resistance strength and medium conductivity. Sands may be chosen in embodiments desiring naturally occurring and cost effective proppants or low particle strength and low conductivity.

The proppant particle 110 may have any size and shape. In some embodiments, the one or more proppant particles 110 may have sizes from 8 mesh to 140 mesh (diameters from 106 micrometers ($\mu$m) to 2.36 millimeters (mm)). In some embodiments, the proppant particles 110 may have sizes from 16 mesh to 30 mesh (diam. 600 $\mu$m to 1180 $\mu$m), 20 mesh to 40 mesh (diam. 420 $\mu$m to 840 $\mu$m), 30 mesh to 50 mesh (diam. 300 $\mu$m to 600 $\mu$m), 40 mesh to 70 mesh (diam. 212 $\mu$m to 420 $\mu$m) or 70 mesh to 140 mesh (diam. 106 $\mu$m to 212 $\mu$m). The sphericity and roundness of the proppant particles 110 may also vary based on the desired application.

In some embodiments, the proppant particles 110 may have a rough surface that may increase adhesion of the $CO_2$-philic coating 120 to the proppant particle 110 and may increase interaction of $CO_2$ with the $CO_2$-philic coating 120. The proppant particles 110 may be roughened to increase the surface area of the proppant particle 110 by any suitable physical or chemical method, including, for example, using an appropriate etchant. In some embodiments, the proppant particle 110 may have a surface that provides a desired adherence of the $CO_2$-philic coating 120 to the proppant particle 110 or may already be sufficiently rough without a need for chemical or physical roughening.

The term "rough" refers to a surface having at least one deviation from the normalized plane of the surface, such as a depression or protrusion. The surface may be uneven and irregular and may have one or more imperfections, such as dimples, stipples, bumps, projections or other surface defects. The rough surface may have an arithmetic average roughness ($R_a$) of greater than or equal to 1 nanometer (nm) (0.001 $\mu$m). $R_a$ is defined as the arithmetic average of the differences between the local surface heights and the average surface height and can be described by Equation 1, contemplating n measurements:

$$R_a = \frac{1}{n}\sum_{i=1}^{n}|y_i| \quad \text{EQUATION 1}$$

In Equation 1, each $y_i$ is the amount of deviation from the normalized plane of the surface (meaning the depth or height of a depression or protrusion, respectively) of the absolute value of the ith of n measurements. Thus, $R_a$ is the arithmetic average of the absolute values of n measurements of deviation y from the normalized plane of the surface. In some embodiments, the surface of the proppant particle 110 may have an $R_a$ of greater than or equal to 2 nm (0.002 $\mu$m), or greater than or equal to 10 nm (0.01 $\mu$m), or greater than or equal to 50 nm (0.05 $\mu$m), or greater than or equal to 100 nm (0.1 $\mu$m), or greater than or equal to 1 $\mu$m.

As previously defined, "$CO_2$-philic," refers to a molecule, ion, polymer, or composition having an affinity or attraction to $CO_2$. A "$CO_2$-philic" material possesses a tendency to mix with, dissolve in, or be wetted by $CO_2$. In some embodiments, the $CO_2$-philic material may be attracted to $CO_2$ molecules through intermolecular forces, such as van der Waals forces, or through hydrogen bonding. The $CO_2$-philic coating 120 may be any coating formed from a material or combination of materials that has a chemical or physical affinity to $CO_2$. The physical affinity of the $CO_2$-philic coating 120 may include, for example, being capable of absorbing or adsorbing $CO_2$ molecules. Without being bound by theory, the chemical affinity or compatibility may be exhibited through the ability of $CO_2$ to solvate the coating material at the molecular level. Solvation of the coating material may, in some instances, result in the $CO_2$-philic coating 120 dissociating from the proppant particle 110 and associating with a $CO_2$-based fluid, viscosifying the $CO_2$-based fluid.

Figure 2:
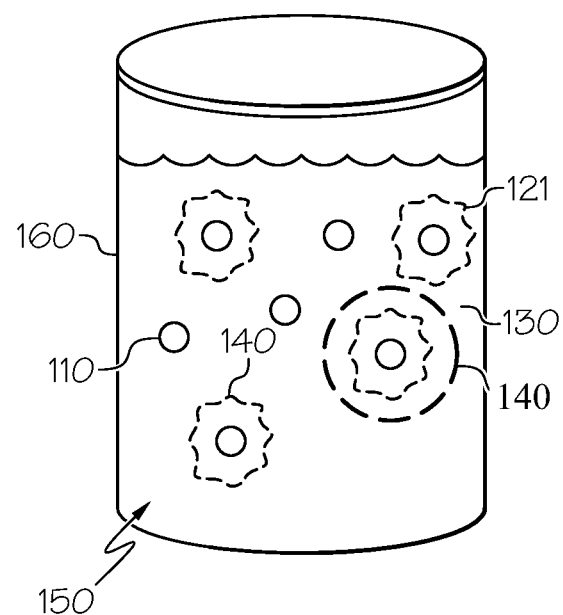
FIG. 2 is a schematic view of a hydraulic fracturing fluid.

As used throughout the disclosure, a "$CO_2$-based fluid" refers to a fluid comprising $CO_2$. In some embodiments, the $CO_2$-based fluid 130 (as shown in FIG. 2) may comprise at least 30 weight percent (wt. %) $CO_2$, based on the total weight of the $CO_2$-based fluid 130 before the $CO_2$-based fluid 130 is contacted with a viscosifying proppant 140. In some embodiments, the $CO_2$-based fluid 130 may comprise at least 45 wt. % or at least 51 wt. % $CO_2$. In some embodiments, the $CO_2$-based fluid 130 may comprise at least 60 wt. %, or at least 75 wt. %, or at least 85 wt. % or at least 90 wt. % $CO_2$.

In some embodiments, the $CO_2$-based fluid 130 may comprise liquid $CO_2$ or gaseous $CO_2$. In some embodiments, the $CO_2$-based fluid 130 may comprise supercritical, subcritical, or critical $CO_2$. As used throughout this disclosure, "supercritical" refers to a substance at a pressure and a temperature greater than those of the substance's critical point, such that distinct phases do not exist and the substance may exhibit the diffusion of a gas while dissolving materials like a liquid. Similarly, "subcritical" refers to a substance with a pressure and a temperature of less than those of the substance's critical point, such that distinct phases exist. Likewise, "critical" refers to a substance that is at a pressure and temperature equal to those of the substance's critical point. In some embodiments, the $CO_2$-based fluid 130 may be supercritical $CO_2$. In some embodiments, the $CO_2$-based fluid 130 may be liquid $CO_2$. In some embodiments, the $CO_2$-based fluid 130 may include substances other than $CO_2$. The $CO_2$-based fluid 130 may contain additional fluids or gasses, including but not limited to $N_2$, dimethyl ether, or hydrocarbons.

As shown in FIG. 1, in some embodiments, the dissolving $CO_2$-philic coating 121 may dissipate upon exposure to $CO_2$ molecules. As shown in FIG. 1, in some embodiments the entire $CO_2$-philic coating 120 may result in a dissolving $CO_2$-philic coating 121 and may entirely dissociate from the proppant particle 110. The dissolving $CO_2$-philic coating 121 in some embodiments, may be only a portion of the $CO_2$-philic coating 120. The solvable portion of the $CO_2$-philic coating 120 that becomes the dissolving $CO_2$-philic coating 121 upon contact with $CO_2$ may be from 10 wt. % to 100 wt. % of the entire $CO_2$-philic coating 120. In some embodiments the solvable portion of the $CO_2$-philic coating, and thus the portion of the dissolving $CO_2$-philic coating 121 that dissociates from the proppant particle 110, may be from a minimum amount of 10 wt. %, 20 wt. %, 30 wt. %, 50 wt. %, 75 wt. %, 80 wt. %, 90 wt. %, 95 wt. %, or 100 wt. % to a maximum amount of 20 wt. %, 30 wt. %, 50 wt. %, 75 wt. %, 80 wt. %, 90 wt. % or 100 wt. % of the original $CO_2$-philic coating 120. It should be understood that these values may be combined to form any suitable range (such as from 10 wt. % to 20 wt. %, or 10 wt. % to 30 wt. %, or 80 wt. % to 95 wt. %, and so on).

In some embodiments, the dissolved portion of the $CO_2$-phillic coating 120 may viscosify the $CO_2$-based fluid 130 to suspend uncoated proppant particles 110. The viscosifying proppants 140 of the present disclosure may obviate or reduce the need to add expensive viscosifiers or other additives to hydraulic fluid, which could reduce time and costs in preparing to treat a subterranean fracture.

In some embodiments, the solvable portion of the dissolving $CO_2$-philic coating 121 may dissociate from the proppant particle 110 and associate with the $CO_2$-based fluid 130. Without being bound by any particular theory, the solvable portion of the dissolving $CO_2$-philic coating 121 may associate with the $CO_2$-based fluid 130 because of attraction between the material of the $CO_2$-philic coating 120 and $CO_2$ molecules in the $CO_2$-based fluid 130. This attraction may cause an increase in the viscosity of the $CO_2$-based fluid 130.

In some embodiments, the $CO_2$-philic coating 120 may begin to dissipate to result in the dissolving $CO_2$-philic coating 121 after less than or equal to 30 minutes. In some embodiments, $CO_2$-philic coating 120 may begin to dissolve to result in the dissolving $CO_2$-philic coating 121 after less than or equal to 45 minutes, or less than or equal to 50 minutes, or less than or equal to 60 minutes, or less than or equal to 3 hours, or less than or equal to 24 hours. In some embodiments, the dissolving $CO_2$-philic coating 121 may begin dissolving after less than or equal to 25 minutes, or less than or equal to 20 minutes, or less than or equal to 15 minutes, or less than or equal to 10 minutes, or less than or equal to 5 minutes.

In some embodiments, the dissolving $CO_2$-philic coating 121 may not only begin to dissolve, but may dissolve in an amount sufficient to increase the viscosity of the $CO_2$-based fluid 130 by at least 5%, or at least 10%, or at least 20%, or at least 50% in less than or equal to 30 minutes (as compared to the original viscosity of the $CO_2$-based fluid 130 at room temperature versus the viscosity of the $CO_2$-based fluid 130 after 30 minutes have passed from the addition of the viscosifying proppants 140 at room temperature). In other embodiments, the dissolving $CO_2$-philic coating 121 may increase the viscosity of the $CO_2$-based fluid 130 by at least 5%, or at least 10%, or at least 20%, or at least 50% in less than or equal to 45 minutes, or less than or equal to 50 minutes, or less than or equal to 60 minutes, or less than or equal to 3 hours, or less than or equal to 24 hours. In other embodiments, the dissolving $CO_2$-philic coating 121 may increase the viscosity of the $CO_2$-based fluid 130 by at least 5%, or at least 10%, or at least 20%, or at least 50% in less than or equal to 25 minutes, or less than or equal to 20 minutes, or less than or equal to 15 minutes, or less than or equal to 10 minutes, such as less than or equal to 5 minutes.

In some embodiments, the $CO_2$-philic coating 120 may include or may consist of oxygen-containing molecules such as polysaccharide acetates, polyethylene glycols, partially fluorinated oxygen-containing polymers, oxygenated polymers, crosslinked oxygen-containing polystyrenes, polyvinyl acetates, or combinations thereof. For instance, in some embodiments, the $CO_2$-philic coating 120 may be a polysaccharide acetate, such as cellulose acetate. The $CO_2$-philic coating 120 in some embodiments may include $CO_2$-philic materials having silicon-containing groups. Examples of $CO_2$-philic materials having silicon-containing groups include polysiloxanes, such as those which include monomeric units such as alkylsiloxanes, fluoroalkylsiloxanes, or chloroalkylsiloxanes. Examples of suitable alkylsiloxanes include dimethyl siloxanes and polydimethylsiloxanes. The $CO_2$-philic coating 120 may comprise halogen compounds (such as fluorine-containing compounds) or compounds having halogenated carbons (for example, fluorocarbons). The $CO_2$-philic coating 120 may comprise branched polyalkylene oxides or fluorinated polyethers, for example. In some embodiments, the $CO_2$-philic coating 120 may comprise a fluoropolymer.

In some embodiments, the $CO_2$-philic coating 120 may be formed from monomeric materials or from oligomeric materials such as, for example, oligomers having 8 or fewer monomer units. The $CO_2$-philic coating 120 may be an oligomer containing less than or equal to 8 repeating monomers, such as 5 or fewer repeating monomers or 3 or fewer repeating monomers. In some embodiments, the $CO_2$-philic coating 120 may be a fluoride-containing oligomer. The $CO_2$-philic coating 120 may be a fluoride-containing oligomer having 8 or fewer repeating monomer units, or 5 or fewer repeating monomer units, or 3 or fewer monomer units. The fluoropolymers may be formed from monomers including, as non-limiting examples, fluoroacrylate monomers such as 2-(N-ethylperfluorooctane-sulfonamido) ethyl acrylate ("EtFOSEA"), 2-(N-ethylperfluorooctane-sulfonamido) ethyl methacrylate ("EtFOSEMA"), 2-(N-methylperfluorooctane-sulfonamido) ethyl acrylate ("MeFOSEA"), 2-(N-methylperfluorooctane-sulfonamido) ethyl methacrylate ("MeFOSEMA"), 1,1'-dihydroperfluorooctyl acrylate ("FOA"), 1,1'-dihydroperfluorooctyl methacrylate ("FOMA"), 1,1',2,2'-tetrahydroperfluoroalkylacrylates, 1,1', 2,2'-tetrahydroperfluoroalkyl-methacrylates and other fluoromethacrylates; fluorostyrene monomers such as α-fluorostyrene and 2,4,6-trifluoromethylstyrene; fluoroalkylene oxide monomers such as hexafluoropropylene oxide and perfluorocyclohexane oxide; fluoroolefins such as tetrafluoroethylene, vinylidine fluoride, and chlorotrifluoroethylene; and fluorinated alkyl vinyl ether monomers such as perfluoro(propyl vinyl ether) and perfluoro(methyl vinyl ether).

The $CO_2$-philic coating 120 may comprise a polyether-based polymer including, but not limited to polyethers substituted with at least one side group, which may include one or more groups that interact favorably with or has an affinity for $CO_2$ (such as a Lewis base group), a poly(ether-carbonate), a poly(ether-carbonate) substituted with at least one side group including a Lewis base, a vinyl polymer substituted with at least one side group including a Lewis base, a poly(ether-ester) or a poly(ether-ester) substituted with at least one side group including a Lewis base. One possible non-limiting example of a Lewis base is an amino functional group.

In some embodiments, the $CO_2$-philic coating 120 may have hydrophobic tendencies, such as a lack of attraction to water, repulsion to water, or immiscibility in water. In some embodiments, the $CO_2$-philic coating 120 does not substantially dissolve, meaning that at least 90 wt. % (such as at least 95 wt. % or at least 98 wt. %) of the $CO_2$-philic coating 120 does not dissolve when the viscosifying proppant 140 is contacted with, submerged in, or otherwise exposed to water. In some embodiments, the $CO_2$-philic coating 120 does not dissociate from the proppant particle 110 when the viscosifying proppant 140 is added to a water-based fluid, such as water or a fluid comprising water. In some embodiments, the $CO_2$-philic coating 120 does not dissociate from the proppant particle 110 when the viscosifying proppant 140 added to a fluid comprising at least 20 wt. % water based on the total weight of the fluid medium. In other embodiments, the $CO_2$-philic coating 120 does not dissociate from the proppant particle 110 when the viscosifying proppant 140 is added to a fluid comprising at least 30 wt. % water, or at least 50 wt. % water, or at least 75 wt. % water.

As shown by FIG. 1, in some embodiments the proppant particle 110 may be coated 310 with a $CO_2$-philic coating 120 to produce, form, or result in a viscosifying proppant 140. In some embodiments, the $CO_2$-philic coating 120 may be a surface layer on or bound to the proppant particle 110 that covers at least a portion of the surface of the proppant particle 110. For instance, the $CO_2$-philic coating 120 may coat, overlay, enclose, envelop or otherwise surround the proppant particle 110 with the coating. The $CO_2$-philic coating 120 may entirely cover the surface of the proppant particle 110 or, alternatively, may only partially surround the proppant particle 110, leaving at least a portion of surface of the proppant particle 110 uncoated or otherwise exposed.

In some embodiments, the $CO_2$-phillic coating 120 may not be substantially crosslinked, meaning that at least 90 wt. % (such as at least 95 wt. % or at least 98 wt. %) of the $CO_2$-philic coating 120 is not crosslinked. In some embodiments, the $CO_2$-philic coating 120 may not have any crosslinking. One non-limiting example of a $CO_2$-philic coating 120 with no crosslinking is a $CO_2$-philic coating made from a thermoset polymer. However, in some embodiments, a slight degree of crosslinking may occur in the $CO_2$-philic coating 120, such as free-radical crosslinking. Without being bound by theory, it is believed that substantial crosslinking (more than 10 wt. % of crosslinking) in the $CO_2$-phillic coating 120 may affect the adherence of the $CO_2$-philic coating 120 to the proppant particle 110, potentially preventing the $CO_2$-philic coating 120 from dissolving into the $CO_2$-based fluid if the $CO_2$-philic coating 120 were substantially crosslinked.

In some embodiments, the viscosifying proppant 140 may have an additional top coat layer. The viscosifying proppant 140 may have a two-layer or a multi-layered coating, which may include three or more, or four or more, or five or more coated layers. Moreover, the viscosifying proppant 140 can be used in conjunction with, or may further comprise a breaker. As used throughout this disclosure, a "breaker" refers to a compound that may break or degrade the polymers of the coating after a fracturing operation to prevent formation damage. In some embodiments, the breaker may be an oxidizer or enzyme breaker. The breaker may be any suitable materials capable of degrading a coating material.

Still referring to FIG. 1, further embodiments of the present disclosure include methods for producing viscosifying proppants 140. In some embodiments, the method may include a coating step 310 to coat a proppant particle 110 with a monomeric precursor material and a polymerizing step to polymerize the precursor material, forming a viscosifying proppant 140.

In some embodiments, the coating step 310 may include contacting the polymerizable precursor material with the proppant particle 110 in a fluidized bed process. In some embodiments, the coating step 310 may include a stationary, bubbling, circulation, or vibratory fluidized bed process. In some embodiments, the coating step 310 may include spraying or saturating proppant particles 110 with a $CO_2$-philic polymer or polymerizable precursor material. The coating step 310 may include, in some embodiments, tumbling or agitating the coated proppant to prevent agglomeration or clumping. In some embodiments, the coating process may be conducted in an emulsion coating technique. The coating step 310 may include mixing a $CO_2$-philic material with another compound such as, for example, a solvent, an initiator, an adhesion promoter, or an additive, to form the $CO_2$-philic coating 120. In some embodiments, the adhesion promoter may comprise a silane, an aminosilane, or a silane-containing monomer, for example. In some embodiments, an adhesion promoter may not be necessary to coat the proppant particles 110.

The polymerizing step may include polymerizing a polymerizable precursor material that has already been coated 310 onto the proppant particle 110. In some embodiments, the polymerizable precursor materials may incorporate a polymerization initiator compound. In some embodiments, the polymerizing step may include heating the coated proppant to a temperature sufficient to polymerize at least a portion of the precursor material. The heating may include applying heat by any suitable process such as by forced-air heating, convection, friction, conduction, combustion, exothermic reactions, microwave heating, or infrared radiation, for example. The proppant particle 110 may be heated at a polymerization temperature and for a polymerization time sufficient to polymerize at least a portion of the precursor material. In some embodiments, the polymerization step may include exposing the coated proppant to ultraviolet (UV) light or any other known polymerization techniques.

In some embodiments, the method for producing viscosifying proppants 140 may further comprise roughening the proppant particles 110 before the coating step 310. The proppant particles 110 may be chemically or physically roughened. In some embodiments, roughening the proppant particles 110 may produce proppant particles 110 having a rough surface with an arithmetic average roughness ($R_a$) of greater than or equal to 0.001 μm (1 nm). In some embodiments, the surface of the proppant particles 110 may have an $R_a$ of greater than or equal to 0.002 μm (2 nm), or greater than or equal to 0.01 μm (10 nm), or greater than or equal to 0.05 μm (50 nm), or greater than or equal to 0.1 μm (100 nm), or greater than or equal to 1 μm, as measured according to the techniques previously described.

Additionally, in some embodiments, the method for producing viscosifying proppants 140 may include additional coating steps to produce a viscosifying proppant 140 with a two-layer coating or a multiple-layered coating system. In some embodiments, the method may include coating at least one proppant particle 110 with a top, overlying coating. The top coating may be added to provide the viscosifying proppant 140 with additional properties or features based on the desired application. Any additives known in the oil-drilling industry may be suitable to add to the viscosifying proppant 140.

Looking now to FIG. 2, a container 160 of viscous hydraulic fracturing fluid 150 is schematically illustrated to show the relationship between the viscosifying proppant particles 140 and the viscous hydraulic fracturing fluid 150. In FIG. 2, the viscosifying proppants 140 have been added to a $CO_2$-based fluid 130. The $CO_2$-philic coating 120 (as shown in FIG. 1) upon exposure to the $CO_2$ molecules resulted in the dissolving $CO_2$-philic coating 121, which is shown in FIG. 2 as dissipating from the proppant particles 110. The dissolving $CO_2$-philic coating 121 may dissociate from the proppant particle 110 to associate with the $CO_2$-based fluid 130, viscosifying the $CO_2$-based fluid 130. Upon the viscosification of the $CO_2$-based fluid 130 as the dissolving $CO_2$-philic coating 121 dissipates, the now uncoated proppant particles 110 may suspend in the $CO_2$-based fluid 130 without requiring additional measures such as turbulence or viscosifiers.

As discussed, in some embodiments, at least a portion of the $CO_2$-philic coating 120 may be solvable in the $CO_2$-based fluid 130 at a pressure of less than or equal to 1000 psi and a temperature of less than or equal to 32° C. In some embodiments, the $CO_2$-philic coating 120 may have at least a portion of the $CO_2$-philic coating 120 that is solvable in supercritical $CO_2$. The $CO_2$-philic coating 120, in some embodiments, may have at least a portion of the $CO_2$-philic coating 120 that is solvable in critical $CO_2$, or subcritical $CO_2$, including but not limited to liquid $CO_2$ and liquid $CO_2$-based fluids. The $CO_2$-philic coating 120, in some embodiments, may have at least a portion of the $CO_2$-philic coating 120 that is solvable in gaseous $CO_2$ and $CO_2$-based gases.

In one particular hypothetical example, a particular proppant particle 110 may be coated with a $CO_2$-philic coating 120 comprising polyvinyl acetate with a general formula $CH_3$—$(CH_2CH(COOCH_3))_n$—$CH_3$, where n is an integer. It should be understood that any $CO_2$-philic material would be suitable and the use of polyvinyl acetate is only one illustrative example of many suitable $CO_2$-philic coatings 120 and dissolving $CO_2$-philic coating 121 on the viscosifying proppant 140. As the $CO_2$-philic coating 120 interacts with $CO_2$ molecules present in the $CO_2$-based fluid 130, the $CO_2$-philicity of the polymer may be drawn to $CO_2$ molecules through various attractive forces, which may cause one or more solvable portions of the $CO_2$-based coating 120 to dissociate and pull away from the proppant particle 110 and associate instead with $CO_2$ molecules in the $CO_2$-based fluid 130. Without intent to be bound by theory, these varying levels of attractive forces may cause the $CO_2$-philic coating 120 to be pulled away from the proppant particle 110 unevenly as it dissolves. In other embodiments, the $CO_2$-philic coating 120 may dissociate from the proppant particle 110 evenly as it dissolves, or may dissociate too quickly to determine the interactions causing dissolution. The molecules of $CO_2$ in the $CO_2$-based fluid 130 may have an affinity for the polyvinyl acetate and remain attracted to the polyvinyl acetate through hydrogen bonding. It is believed that such hydrogen bonding may cause the $CO_2$-philicity of the polymer, which may dissipate from the proppant particle 110 as the molecules are attracted away from the proppant particle 110 and into the $CO_2$-based fluid 130. Particularly, the oxygen and hydrogen in polyvinyl acetate may be attracted to the carbon and oxygen of the $CO_2$ molecules, causing the $CO_2$-philic coating 120 to dissolve into the $CO_2$-based fluid 130. As described, in some embodiments, the proppant particle 110 may have a roughened surface to increase the interaction and potential contact areas between the proppant particle 110 and the $CO_2$-philic coating 120. It should be understood that hydrogen bonding is not the only attractive force that may increase the $CO_2$-philicity of the $CO_2$-philic coating 120. For example, $CO_2$ is a Lewis acid and may interact with functional groups capable of serving as a Lewis bases (such as a carbonyl group). Therefore, acid-base relationships may be taken advantage of in the selection of suitable coating materials to increase the $CO_2$-philicity and the constraining mechanism for $CO_2$ within the coating matrix of the viscosifying proppants 140 in the $CO_2$-based fluid 130.

In some embodiments, the $CO_2$-philic material may comprise fluorine functional groups. In some embodiments, the $CO_2$-philic material may be synthesized from renewable sources or inexpensive starting materials. As previously described, the $CO_2$-philic material may comprise polysaccharide acetates (such as cellulose acetate), polyethylene glycols, polysiloxanes, modified polysiloxanes, partially fluorinated polymers, oxygenated polymers, crosslinked polystyrenes, polyvinyl acetates, or combinations of any of these. In some embodiments, more than one attractive force may cause the dissociation of the dissolving $CO_2$-philic coating 121 from the proppant particles 110. In some embodiments, these varying attractive forces may cause only a portion of the dissolving $CO_2$-philic coating 121 to dissociate or may cause various portions of the dissolving $CO_2$-philic coating 121 to dissociate at differing time intervals.

In some embodiments, the $CO_2$-based fluid 130 may include substances other than $CO_2$, provided the $CO_2$-based fluid 130 contains an amount of $CO_2$ sufficient for the viscosifying proppants 140 to dissipate in the $CO_2$-based fluid 130. In some embodiments, the $CO_2$-based fluid 130 may contain additional fluids or gasses, such as $N_2$ or dimethyl ether. For example, the $CO_2$-based fluid 130 may be a blend or mixture of $CO_2$ and $N_2$ or a blend or mixture of $CO_2$ and dimethyl ether. Without being bound by theory, in some embodiments where the $CO_2$-philic coating 120 may include or be formed of polystyrene, a blend of $CO_2$ and dimethyl ether may be used to improve efficiency of the dissipation of the dissolving $CO_2$-philic coating 121.

Further embodiments of present disclosure include methods for preparing a viscous hydraulic fracturing fluid 150. In some embodiments, the method of preparing a viscous hydraulic fracturing fluid 150 includes combining a $CO_2$-based fluid 130 having a first viscosity at a pressure of less than or equal to 1000 pounds per square inch (psi) and a temperature of less than or equal to 32° C. with the viscosifying proppants 140 to produce a viscous hydraulic fracturing fluid 150 having a second viscosity at a pressure of less than or equal to 1000 psi and a temperature of less than or equal to 32° C. that is at least 25% greater than the first viscosity when measured 30 minutes after combining the $CO_2$-based fluid 130 and the viscosifying proppants 140.

The $CO_2$-based fluid 130 and viscosifying proppants 140 may be in accordance with any of the embodiments described with reference to FIGS. 1 and 2. In some embodiments, the viscous hydraulic fracturing fluid 150 may not contain additional external viscosifiers. Unlike the $CO_2$-based fluid 130, in some embodiments viscosifying proppants 140 may suspend within the viscous hydraulic fracturing fluid 150 without a need for, or with a reduced need for additives, such as additional external viscosifiers. The viscous hydraulic fracturing fluid 150 in some embodiments may include any additives commonly used in the art of fracking, including viscosifiers. The viscous hydraulic fracturing fluid 150 may include biocides, breakers, buffers, stabilizers, diverting agents, fluid loss additives, friction reducers, iron controllers, surfactants, gel stabilizers, and viscosifiers, for example. In some embodiments, the viscous hydraulic fracturing fluid 150 may contain less than or equal to 10 wt % additional external viscosifiers. The viscous hydraulic fracturing fluid 150 may contain less than or equal to 8 wt %, or less than or equal to 5 wt %, or less than or equal to 3 wt % additional external viscosifiers.

Upon combining the $CO_2$-based fluid 130 with the viscosifying proppants 140, it is believed the solvable portion of the dissolving $CO_2$-philic coating 121 may dissociate from the proppant particle 110 (as shown in FIG. 1) and associate with the $CO_2$-based fluid 130 to produce the viscous hydraulic fracturing fluid 150. The $CO_2$-based fluid 130 may have a first viscosity that is insufficiently viscous to support the proppant particles 110 (now uncoated as the solvable portion of the dissolving $CO_2$-philic coating 121 may dissociate from the proppant particle 110 of the viscosifying proppant particles 140). At least 30 minutes after the $CO_2$-based fluid 130 and the viscosifying proppants 150 are combined, the produced viscous hydraulic fracturing fluid 150 may have a second viscosity sufficiently viscous to support the proppant particles 110.

In some embodiments, the viscous hydraulic fracturing fluid 150 may have a second viscosity that is greater than or equal to 25% greater than the first viscosity of the $CO_2$-based fluid 130 when the second viscosity is measured at least 30 minutes after combining the $CO_2$-based fluid 130 and the viscosifying proppants 140. In some embodiments, the viscous hydraulic fracturing fluid 150 may have a second viscosity that is greater than or equal to 25% greater than the first viscosity of the $CO_2$-based fluid 130 when measured less than or equal to 30 minutes after combining the $CO_2$-based fluid 130 and the viscosifying proppants 140, such as less than or equal to 25 minutes, less than or equal to 15 minutes, less than or equal to 10 minutes, or less than or equal to 3 minutes after combining the $CO_2$-based fluid 130 and the viscosifying proppants 140. Similarly, the viscous hydraulic fracturing fluid 150 may have a second viscosity that is greater than or equal to 25% greater than the first viscosity of the $CO_2$-based fluid 130 when measured at least 40 minutes after combining the $CO_2$-based fluid 130 and the viscosifying proppants 140, such as at least 45 minutes, at least 60 minutes, or at least 90 minutes after combining the $CO_2$-based fluid 130 and the viscosifying proppants 140.

The viscous hydraulic fracturing fluid 150 may have a second viscosity that, in some embodiments, may be greater than or equal to 30% greater than the first viscosity (the viscosity of the $CO_2$-based fluid 130). In some embodiments, the viscous hydraulic fracturing fluid 150 may have a second viscosity that, in some embodiments, may be at least 35% greater than, or greater than or equal to 40% greater than, or greater than or equal to 50% greater than the first viscosity of the $CO_2$-based fluid 130. In some embodiments, the viscous hydraulic fracturing fluid 150 may have a second viscosity that, in some embodiments, may be greater than or equal to 75% greater than, or greater than or equal to 90% greater than, or greater than or equal to 100% greater than, or greater than or equal to 200% greater than, or greater than or equal to 300% greater than the first viscosity of the $CO_2$-based fluid 130 when the second viscosity is measured at least 40 minutes after combining the $CO_2$-based fluid 130 and the viscosifying proppants 140.

In some embodiments, the viscous hydraulic fracturing fluid 150 may have a second viscosity of greater than or equal to 0.1 centipoises (cP) at a pressure of less than or equal to 1000 psi and a temperature of less than or equal to 32° C. The viscous hydraulic fracturing fluid 150 may have a second viscosity of greater than or equal to 1 cP, or greater than or equal to 5 cP, or greater than or equal to 10 cP, or greater than or equal to 30 cP, all of which are measured at a pressure of less than or equal to 1000 psi and a temperature of less than or equal to 32° C. The viscous hydraulic fracturing fluid 150 may have a second viscosity of greater than or equal to 0.1 cP at a pressure of less than or equal to 1000 psi, 850 psi, 600 psi, or 500 psi. The viscous hydraulic fracturing fluid 150 may have a second viscosity of greater than or equal to 0.1 cP at temperatures of less than or equal to 35° C., such as less than or equal to 30° C., or less than or equal to 25° C., or less than or equal to 10° C., or even less than or equal to 0° C. Similarly, in some embodiments, the viscous hydraulic fracturing fluid 150 may have a second viscosity of greater than or equal to 1 cP at a pressure of less than or equal to 1000 psi and a temperature of greater than or equal to 32° C. The viscous hydraulic fracturing fluid 150 may have a viscosity of greater than or equal to 0.1 cP at temperatures of greater than or equal to 35° C., such as greater than or equal to 50° C., or greater than or equal to 65° C., or greater than or equal to 80° C., or greater less than or equal to 100° C.

Figure 3:
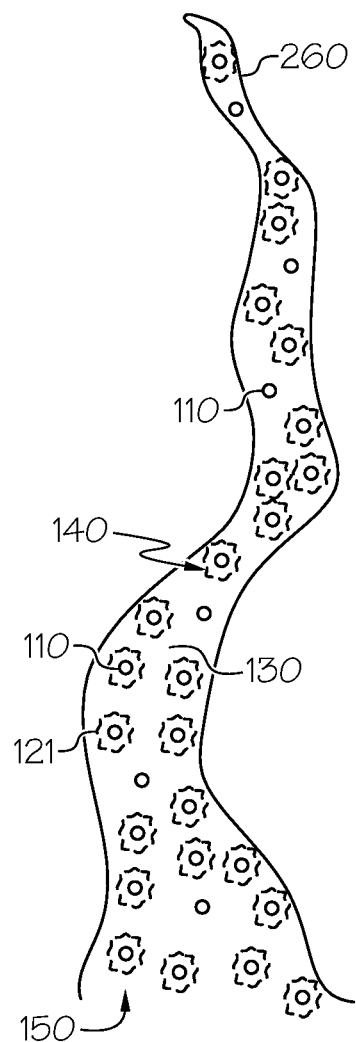
FIG. 3 is a schematic view of a subterranean fracture being contacted with a viscous hydraulic fracturing fluid according to embodiments shown and described.

FIG. 3 is a diagram of a treatment of a subterranean fracture with viscous hydraulic fracturing fluid 150 according to any of the embodiments previously shown and described with reference to FIGS. 1, and 2. As discussed, proppant particles 110 may suspend within a viscous hydraulic fracturing fluid 150 to aid in treating subterranean fractures by keeping a fracture open.

In FIG. 3, the subterranean fracture 260 has been propagated by contacting the subterranean fracture 260 with viscous hydraulic fracturing fluid 150. The viscous hydraulic fracturing fluid 150 includes viscosifying proppants 140 suspended in a $CO_2$-based fluid 130. In some embodiments, the viscosifying proppants 140 may be distributed throughout the $CO_2$-based fluid. As shown, the dissolving $CO_2$-philic coatings 121 are dissipating from the proppant particles 110 into the $CO_2$-based fluid 130, viscosifying the $CO_2$-based fluid 130 such that the now uncoated proppant particles 110 suspend in the fluid.

Conventionally, as previously discussed, $CO_2$-based fluids 130 may not be sufficiently viscous to suspend uncoated proppant particles 110, the uncoated proppant particles 110 may sink to the bottom of conventional $CO_2$-based hydraulic fracturing fluid. In some instances, the lack of suspension in the hydraulic fluid may cause the proppant particles 110 to break into irregular proppant particle shards. Without being bound by theory, the weight of the settled particles packing into one another, the required turbulence and force used to inject the heavy proppant particles 110 into a subterranean formation, or both, may cause the proppant particles 110 to splinter into smaller, irregularly shaped proppant particle shards. The proppant particle shards may tightly pack together in the subterranean formation, obstructing the conductivity and flow of material (such as hydraulic fluid and oil) from a subterranean fracture 260.

Embodiments of the present disclosure include methods of treating a subterranean formation by contacting the subterranean formation with viscous hydraulic fracturing fluid 150 comprising viscosifying proppants 140 and $CO_2$-based fluid 130 in accordance with any of the embodiments previously discussed. Such methods of treating a subterranean formation may include propagating at least one subterranean fracture 260 in the subterranean formation to treat the subterranean formation. In some embodiments, the subterranean formation may include a rock, coal, or shale formation. In some embodiments, the contacting of the subterranean formation may include drilling into the subterranean formation and subsequently injecting the viscous hydraulic fracturing fluid 150 into at least one subterranean fracture 260 in the subterranean formation.

Though embodiments of the present disclosure have been discussed in the context of hydraulic fracturing processes, embodiments of the present disclosure may also be used in other industries. For instance, in some embodiments, the viscosifying proppants 140 and viscous hydraulic fracturing fluid 150 may be used to stimulate groundwater wells, to precondition or induce rock cave-ins for mining operations, to dispose of waste by injecting it deeply into rock, to measure stresses in the Earth's crust, to generate electricity in enhanced geothermal systems, or to increase injection rates for the geologic sequestration of $CO_2$.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A viscosifying proppant comprising proppant particles coated with a $CO_2$-philic coating, in which:
   the $CO_2$-philic coating comprises a $CO_2$-philic material chosen from cellulose acetates, partially fluorinated oxygen-containing polymers, oxygenated polymers, crosslinked oxygen-containing polystyrenes, or combinations of any of these;
   when the viscosifying proppant is added to a $CO_2$-based fluid comprising at least 30 weight percent carbon dioxide, a solvable portion of the $CO_2$-philic coating dissociates from the proppant particles, associates with the carbon dioxide in the $CO_2$-based fluid, and sufficiently viscosifies the $CO_2$-based fluid to cause the proppant particles to suspend in the $CO_2$-based fluid; and
   when the viscosifying proppant is added to a fluid comprising at least 30 weight percent water, the $CO_2$-philic coating does not dissociate from the proppant particles.

2. The viscosifying proppant of claim 1, in which greater than or equal to 90 wt. % of the $CO_2$-philic coating is not crosslinked.

3. The viscosifying proppant of claim 1, in which the proppant particles have a rough surface having an arithmetic average roughness ($R_a$) of greater than or equal to 1 nanometer (nm).

4. The viscosifying proppant of claim 1, in which the proppant particles are particles of a material selected from the group consisting of oxides, silicates, sand, ceramic, resin, plastic, mineral, glass, graded sand, treated sand, resin-coated sand, other resin-coated particles, bauxite, sintered bauxite, glass particles, glass beads, and combinations of any of these.

5. The viscosifying proppant of claim 1, in which the $CO_2$-philic material comprises partially fluorinated oxygen-containing polymers of a monomer selected from the group consisting of 2-(N-ethylperfluorooctane-sulfonamido) ethyl acrylate, 2-(N-ethylperfluorooctane-sulfonamido) ethyl methacrylate, 2-(N-methylperfluorooctane-sulfonamido) ethyl acrylate, 2-(N-methylperfluorooctane-sulfonamido) ethyl methacrylate, 1,1'-dihydroperfluorooctyl acrylate, 1,1'-dihydroperfluorooctyl methacrylate, 1,1',2,2'-tetrahydroperfluoroalkylacrylates, 1,1',2,2'-tetrahydroperfluoroalkylmethacrylates, hexafluoropropylene oxide, perfluorocyclohexane oxide, perfluoro(propyl vinyl ether), and perfluoro(methyl vinyl ether).

6. The viscosifying proppant of claim 1, in which, when the viscosifying proppant is added to a fluid comprising at least 75 weight percent water, the $CO_2$-philic coating does not dissociate from the proppant particles.

7. The viscosifying proppant of claim 1, in which, when the viscosifying proppant is added to a $CO_2$-based fluid consisting of at least 45 weight percent carbon dioxide and at least one of nitrogen, dimethyl ether, or hydrocarbons, the solvable portion of the $CO_2$-philic coating dissociates from the proppant particles, associates with the carbon dioxide in the $CO_2$-based fluid, and sufficiently viscosifies the $CO_2$-based fluid to cause the proppant particles to suspend in the $CO_2$-based fluid.

8. The viscosifying proppant of claim 1, in which, when the viscosifying proppant is added to a $CO_2$-based fluid consisting of at least 90 weight percent carbon dioxide and at least one of nitrogen, dimethyl ether, or hydrocarbons, the solvable portion of the $CO_2$-philic coating dissociates from the proppant particles, associates with the carbon dioxide in the $CO_2$-based fluid, and sufficiently viscosifies the $CO_2$-based fluid to cause the proppant particles to suspend in the $CO_2$-based fluid.

9. The viscosifying proppant of claim 1, in which, when the viscosifying proppant is added to a $CO_2$-based fluid consisting of carbon dioxide, the solvable portion of the $CO_2$-philic coating dissociates from the proppant particles, associates with the carbon dioxide in the $CO_2$-based fluid, and sufficiently viscosifies the $CO_2$-based fluid to cause the proppant particles to suspend in the $CO_2$-based fluid.

10. The viscosifying proppant of claim 1, in which, when the viscosifying proppant is added to a $CO_2$-based fluid consisting of supercritical carbon dioxide and at least one of nitrogen, dimethyl ether, or hydrocarbons, the solvable portion of the $CO_2$-philic coating dissociates from the proppant particles, associates with the carbon dioxide in the $CO_2$-based fluid, and sufficiently viscosifies the $CO_2$-based fluid to cause the proppant particles to suspend in the $CO_2$-based fluid.

11. The viscosifying proppant of claim 1, in which, when the viscosifying proppant is added to a $CO_2$-based fluid consisting of subcritical carbon dioxide and at least one of nitrogen, dimethyl ether, or hydrocarbons, the solvable portion of the $CO_2$-philic coating dissociates from the proppant particles, associates with the carbon dioxide in the $CO_2$-based fluid, and sufficiently viscosifies the $CO_2$-based fluid to cause the proppant particles to suspend in the $CO_2$-based fluid.

12. The viscosifying proppant of claim 1, in which,
when the viscosifying proppant is added to a $CO_2$-based fluid consisting of subcritical carbon dioxide and at least one of nitrogen, dimethyl ether, or hydrocarbons, the solvable portion of the $CO_2$-philic coating dissociates from the proppant particles, associates with the carbon dioxide in the $CO_2$-based fluid, and sufficiently viscosifies the $CO_2$-based fluid to cause the proppant particles to suspend in the $CO_2$-based fluid; and
the $CO_2$-based fluid is a liquid.

13. A viscosifying proppant comprising proppant particles coated with a $CO_2$-philic coating, in which:
the $CO_2$-philic coating comprises a $CO_2$-philic material chosen from partially fluorinated oxygen-containing polymers;
the partially fluorinated oxygen-containing polymers are polymers of monomers selected from the group consisting of 2-(N-ethylperfluorooctane-sulfonamido) ethyl acrylate, 2-(N-ethylperfluorooctane-sulfonamido) ethyl methacrylate, 2-(N-methylperfluorooctane-sulfonamido) ethyl acrylate, 2-(N-methylperfluorooctane-sulfonamido) ethyl methacrylate, 1,1'-dihydroperfluorooctyl acrylate, 1,1'-dihydroperfluorooctyl methacrylate, 1,1',2,2'-tetrahydroperfluoroalkylacrylates, 1,1',2,2'-tetrahydroperfluoroalkyl-methacrylates, hexafluoropropylene oxide, perfluorocyclohexane oxide, perfluoro(propyl vinyl ether), and perfluoro(methyl vinyl ether);
when the viscosifying proppant is added to a $CO_2$-based fluid consisting of at least 30 weight percent carbon dioxide as either supercritical carbon dioxide or subcritical carbon dioxide and at least one of nitrogen, dimethyl ether, or hydrocarbons, a solvable portion of the $CO_2$-philic coating dissociates from the proppant particles, associates with the carbon dioxide in the $CO_2$-based fluid, and sufficiently viscosifies the $CO_2$-based fluid to cause the proppant particles to suspend in the $CO_2$-based fluid; and
when the viscosifying proppant is added to a fluid comprising at least 30 weight percent water, the $CO_2$-philic coating does not dissociate from the proppant particles.

14. The viscosifying proppant of claim 13, in which the proppant particles are particles of a material selected from the group consisting of oxides, silicates, sand, ceramic, resin, plastic, mineral, glass, graded sand, treated sand, resin-coated sand, other resin-coated particles, bauxite, sintered bauxite, glass particles, glass beads, and combinations of any of these.

15. The viscosifying proppant of claim 13, in which,
when the viscosifying proppant is added to a $CO_2$-based fluid consisting of at least 51 weight percent subcritical carbon dioxide and at least one of nitrogen, dimethyl ether, or hydrocarbons, the solvable portion of the $CO_2$-philic coating dissociates from the proppant particles, associates with the carbon dioxide in the $CO_2$-based fluid, and sufficiently viscosifies the $CO_2$-based fluid to cause the proppant particles to suspend in the $CO_2$-based fluid; and
the $CO_2$-based fluid is a liquid.

16. The viscosifying proppant of claim 13, in which,
when the viscosifying proppant is added to a $CO_2$-based fluid consisting of at least 90 weight percent subcritical carbon dioxide and at least one of nitrogen, dimethyl ether, or hydrocarbons, the solvable portion of the $CO_2$-philic coating dissociates from the proppant particles, associates with the carbon dioxide in the $CO_2$-based fluid, and sufficiently viscosifies the $CO_2$-based fluid to cause the proppant particles to suspend in the $CO_2$-based fluid; and
the $CO_2$-based fluid is a liquid.

* * * * *